(12) United States Patent
Yan et al.

(10) Patent No.: US 10,938,624 B2
(45) Date of Patent: Mar. 2, 2021

(54) AUTOMATIC INTEGRATED CONTROL LOOP FOR FAULT, PERFORMANCE AND SERVICE QUALITY MANAGEMENT

(71) Applicants: AT&T Intellectual Property I, L.P., Atlanta, GA (US); AT&T Mobility II LLC, Atlanta, GA (US)

(72) Inventors: He Yan, Berkeley Heights, NJ (US); Zihui Ge, Madison, NJ (US); Giritharan Rana, Basking Ridge, NJ (US); Heather Magrini, Penfield, IL (US); Jennifer Yates, Morristown, NJ (US); Matthew Osinski, Westfield, NJ (US); Brandon Hall, Atlanta, GA (US); Edward Ball, Overland Park, KS (US); Richard Miller, Dallas, GA (US); Kathryn W. Childs, Concord, NC (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/399,750

(22) Filed: Apr. 30, 2019

(65) Prior Publication Data
US 2020/0351149 A1   Nov. 5, 2020

(51) Int. Cl.
*H04L 12/24* (2006.01)

(52) U.S. Cl.
CPC ........ *H04L 41/065* (2013.01); *H04L 41/0613* (2013.01); *H04L 41/0654* (2013.01); *H04L 41/5009* (2013.01)

(58) Field of Classification Search
CPC .............. H04L 41/0613; H04L 41/065; H04L 41/0654; H04L 41/5009
See application file for complete search history.

(56) References Cited

U.S. PATENT DOCUMENTS

| | | | |
|---|---|---|---|
| 5,872,911 A * | 2/1999 | Berg | H04L 43/00 379/111 |
| 9,313,091 B1 * | 4/2016 | Schnegelberger | H04L 41/0631 |
| 9,807,229 B1 * | 10/2017 | Gutierrez, Jr. | H04M 3/085 |
| 2009/0177354 A1 * | 7/2009 | Agrawal | G01M 17/007 701/33.4 |
| 2017/0019312 A1 * | 1/2017 | Meyer | G06N 5/048 |

* cited by examiner

*Primary Examiner* — Gil H. Lee
(74) *Attorney, Agent, or Firm* — BakerHostetler

(57) ABSTRACT

A method includes collecting operational data from a system, segregating the data into a first component comprising one or more service quality anomalies and a second component comprising one or more network-based events, correlating the first component and the second component to determine whether the one or more network-based events have an impact on service quality, and prioritizing a resolution of the network-based events that have an impact on service quality.

16 Claims, 5 Drawing Sheets

AUTOMATIC INTEGRATED CONTROL LOOP FOR FAULT, PERFORMANCE AND SERVICE QUALITY MANAGEMENT

TECHNICAL FIELD

This disclosure relates generally to adaptation of control loop, and more particularly, to a system and method for integrating fault, performance and service quality management in an integrated control loop.

BACKGROUND

In run-time platform environments, the management of fault, performance and service quality have traditionally been managed in separate silos. This is true both from with respect to systems and operations organizations. Such a separation of functionality leads to inherent inefficiencies. For example, a failure may trigger an alert for performance issues and service quality issues, meaning multiple teams may be investigating a single failure. In the field of telecommunications, this can manifest itself in the failure of a cell site in the mobility Radio Access Network (RAN). Such a failure may cause traffic to be re-routed to neighboring cell sites which can cause unexpected congestion due to the increased load. The congestion may lead to service impacts including increased blocked and/or dropped call rates. Thus, the failure of a single cell site may generate an alert for that failure but also multiple downstream alerts for the congested cell sites without reference to the failed cell site. This is clearly inefficient. t, and requires intelligent systems to relate, or correlate, these different symptoms of the underlying cell tower failure.

Accordingly, there is a need for an intelligent system and method to correlate the different symptoms to focus on the root cause of the symptoms.

SUMMARY

The present disclosure is directed to a method comprising, collecting operational data from a system, segregating the data into a first component comprising one or more service quality anomalies and a second component comprising one or more network-based events, wherein the network-based events are one of a network-based fault or a degradation of network performance, correlating the first component and the second component to determine whether the one or more network-based events have an impact on service quality, and resolving the network-based events that have an impact on service quality. The method may further include prioritizing a resolution of the network-based events that have a greater impact on service quality. In an aspect, the analysis of the second component may include collecting network-based event data and correlating the network-based event data to determine a common cause of symptoms associated with the network-based event and wherein an analysis of the first component may include comparing service quality measurements to key performance indicators to determine the one or more service quality anomalies. In an aspect, the correlating step may annotates the network-based events with the service quality anomalies.

In an aspect, the method may further include determining that a silent fault has occurred wherein the silent fault includes multiple symptoms and wherein the method further comprises analyzing the multiple symptoms to localize the silent fault based on the multiple symptoms. The silent fault may then be published for further analysis. The method may further include determining that a silent fault has not occurred and if a silent fault has not occurred, then a root cause of the service quality anomaly is determined.

The present disclosure is also directed to a system including a data collector configured to collect service metrics and network metrics, a service anomaly detector in communication with the data collector wherein the service anomaly detector determines service level impacts, a network event processor in communication with the data collector, and a service impact analyzer configured to annotate network-based events with the service quality impacts. The system may also include a a filter in communication with the service anomaly detector and the service impact analyzer, wherein the filter is configured to separate silent failures from other faults and wherein a silent failure has multiple symptoms and wherein the system further comprises a silent failure localization processor configured to correlate the multiple symptoms to assist in further resolution of the network-based events having service level impact. In an aspect, the network metrics includes network fault data and network performance data.

The present disclosure is also directed to an analyzer including a data collector configured to collect service metrics and network metrics wherein the analyzer is in communication with the data collector, the analyzer having an input-output interface, a processor coupled to the input-output interface wherein the processor is coupled to a memory, the memory having stored thereon executable instructions that when executed by the processor cause the processor to effectuate operations including segregating the data into a first component comprising the service metrics and a second component comprising the network metrics, analyzing the first component to identify at least one service impact anomaly, analyzing the second component to identify at least one network event, correlating the first component and the second component based on the analyzing step, and annotating the network event with the service impact anomaly The operations may further include resolving the network event if the network event has an impact on service quality metrics. In an aspect, there may be plurality of network events and wherein the operations further include prioritizing a resolution of the network event having a greater impact on the service quality metrics. In an aspect, the network event is one of a network-based fault or a degradation of network performance. The operations may further include determining that a silent fault has occurred wherein the silent fault comprises multiple symptoms and wherein the operations further comprise analyzing the multiple symptoms to localize the silent fault based on the multiple symptoms. In an aspect, the operations may further determine that a silent fault has not occurred and if a silent fault has not occurred, then a root cause of the service impact anomaly is determined.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
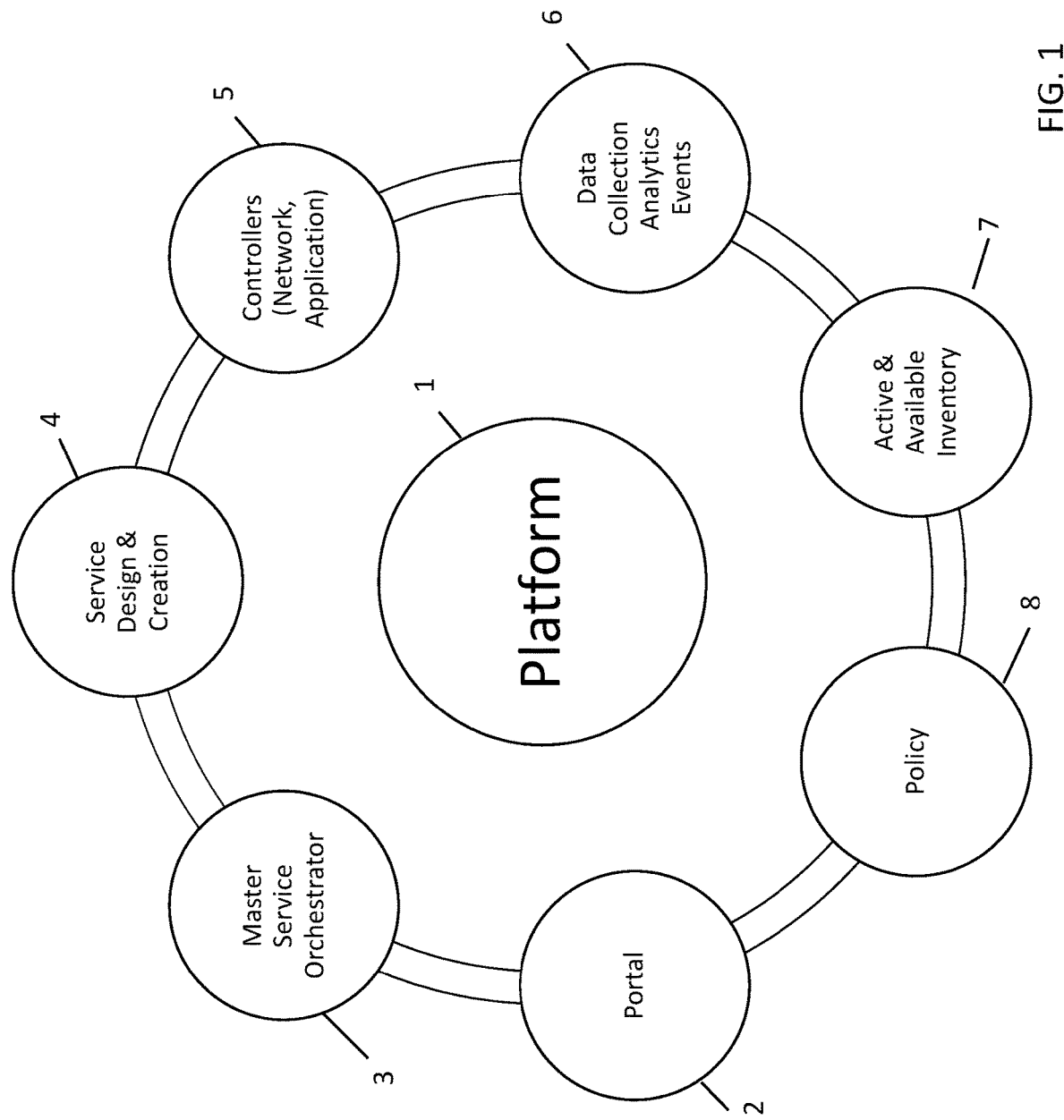
FIG. 1 is a representation of an exemplary functional integrated service development and delivery platform on which the systems and methods of the present disclosure may be implemented.

Overview. As detailed herein, the present disclosure is directed to a system and method to more effectively and efficiently manage network operations. The disclosure provides a holistic approach to detecting and isolating network and service issues, quantifying the customer impact of network issues and eliminating operational inefficiencies associated with service and network teams investigating common issues.

The disclosure focuses on three aspects of network management. The first aspect may be fault management which may, for example, include alarms, traps, Syslog messages, and hard errors such as cut fiber optic cables, application services unexpectedly going offline, power failures and any other hard errors. The second aspect of network management may include performance management which may, for example, include measurements with respect to packet loss rates, latency, speed degradation and the like. The third aspect of network management may include service quality management which is directed to an end-to-end customer-perceived quality measurement. This third aspect may include, for example, quality issues such as video delivery in a lower resolution.

By integrating these three aspects of network management, the network operator may be able prioritize the resolution of network issues. For example, an increased latency between routers in the network may trigger a network alarm, but it may not result in degradation of a service and thus have no impact on the customer experience. As such, that problem may be placed on a lower priority for resolution. Conversely, the larger the impact on the impact on the customer experience, the higher the priority for resolution. Moreover, the integration of these three network management functions may result in more efficient use of resources assigned to resolve a single that may manifest itself in 2 or more areas.

The present disclosure provides an integrated control loop which is an integrated tool to combine the various aspects of network management. At the core of the disclosure is a data collection analytics and events ("DCAE") engine. The DCAE engine will collect and analyze data and trigger certain actions based on the correlation of symptoms of any anomalies detected in the network. For example, anomalies impacting the customer experience may compare performance metrics to key performance indications (KPIs) while anomalies in the network may include symptoms such as alarms or traps.

The DCAE engine may include a service impact analyzer which annotates all detected network events with the service indicators to identify which events may influence the customer experience. In other words, the service impact analyzer may identify the "where" and "how" a network event impacts a customer. A generic spatial-temporal event correlation engine may produce a flow of network events annotated with their service impact and a flow of silent service events, which may, for example, include service issues with no known associated network root causes. These flows can then be fed into various downstream systems for manual exploration and inspection, which may, for example, include SQM Explorer, ticket dispatch optimization, or closed-loop automation updates to policy engines and controllers.

System Architecture.

The present disclosure is applicable across multiple industries and with various configurations. For the purposes of this disclosure, an exemplary but non-limiting software defined network telecommunications system utilizing virtual network functions will be used.

Generally, a run-time execution platform 10 shown in FIG. 1, which may, for example, be configured as an ECOMP platform such as the platform developed by AT&T, the assignee of the present application, and which may be considered the intelligence in a software defined network (SDN) that provides lifecycle management and control of software-centric network resources, infrastructure and services. It will be understood that ECOMP is but one example of a run-time execution platform 10 which may serve as the operating environment for the present disclosure. The run time execution platform 10 may be a reusable platform of software assets comprising the following functionality:

Service Design and Creation (SDC)—Provides a well-structured organization of visual design & simulation tools, templates and catalogs to model and create resources, services and products;

Master Service Orchestration (MSO)—Arranges, sequences and implements tasks based on policies and rules/recipes to coordinate the creation, modification or removal of logical and physical resources in the managed environment;

Data Collection, Analytics and Events (DCAE)—Provides real-time fault, performance, event and other data collection, correlation & analysis to manage service, network and infrastructure health and support closed loop automation;

Policy—Modifiable rules, assertions and/or conditions to enable real-time decision making on corrective actions and configuration changes in the software-centric network ecosystem;

Active and Available Inventory—tracks the dynamic relationships of virtualized networks, services & resources, their relationships and status to maintain ECOMP platform integrity and the global inventory it manages;

DN & Application Controller—SDN Controllers configure, monitor and maintain the health of network services and elements throughout their lifecycle. Application controllers configure, monitor and maintains the health of an applications throughout their lifecycle; and Portal—Provides a common portal framework and UI architecture for creating and operating virtual infrastructure and services. Examples of capabilities include common look and feel, role administration, access control, SDK with plug-ins and web components.

While the present disclosure describes the automatic variable automation of control loops in the in the context of run time execution platform policies, the system and method described herein, and the claims appended hereto apply to the variation of automated control loops generally.

With reference to FIG. 1, there is shown a conceptual diagram of a system 9. The system 9 may include a model-driven software architecture which makes services and operations available to users. The system 9 may include functionality to facilitate user development of software applications, products & solutions. The system may have a central platform 1 which may, for example, be an open source platform and may include machine learning and other analytics and provide the interactions of additional functionality relating to creating services and policies and operating network functionality. Interacting with the platform 1 may be an access portal 2 and a master service orchestrator 3. The master service orchestrator 3 may manage the delivery, modification or removal of networks and services and provide cross-domain orchestration to optimize the utilization of resources or to take corrective action. The master services orchestrator 3 may interact with various applications to collect data to determine network parameters.

The system 9 may include a service design may include a service design and creation function 4 interacting with the platform 1. The service design and creation function 4 may provide a rich catalog-driven environment to construct and maintain service and resource definitions, constraints and management processes and policies. Also shown in FIG. 1 is a set of controllers 5. The controllers 5 may include network controllers for instantiating, configuring, and managing the lifecycle transport virtual network functions (VNFs) and network infrastructure, service/app controllers for instantiating, configuring and managing the lifecycle of service virtual functions (VFs), and infrastructure controllers for instantiating, configuring, and managing the lifecycle of infrastructure such as computational capacity and storage.

There is also shown a data collection analytics and events function 6. The data collection analytics and event function 6 may collect data and events necessary to manage networks and make data available to real time applications. The data collection analytics and event function 6 may provide the framework for analytics applications to identify patterns and anomalies and to publish events to drive closed-loop control. Also shown is an active and availability inventory function 7 which may provide a real-time topology map with views of virtual networks, services and applications. Finally, there is shown a policy function 8 which creates, maintains and modifies policies associated with system 9.

Figure 2:
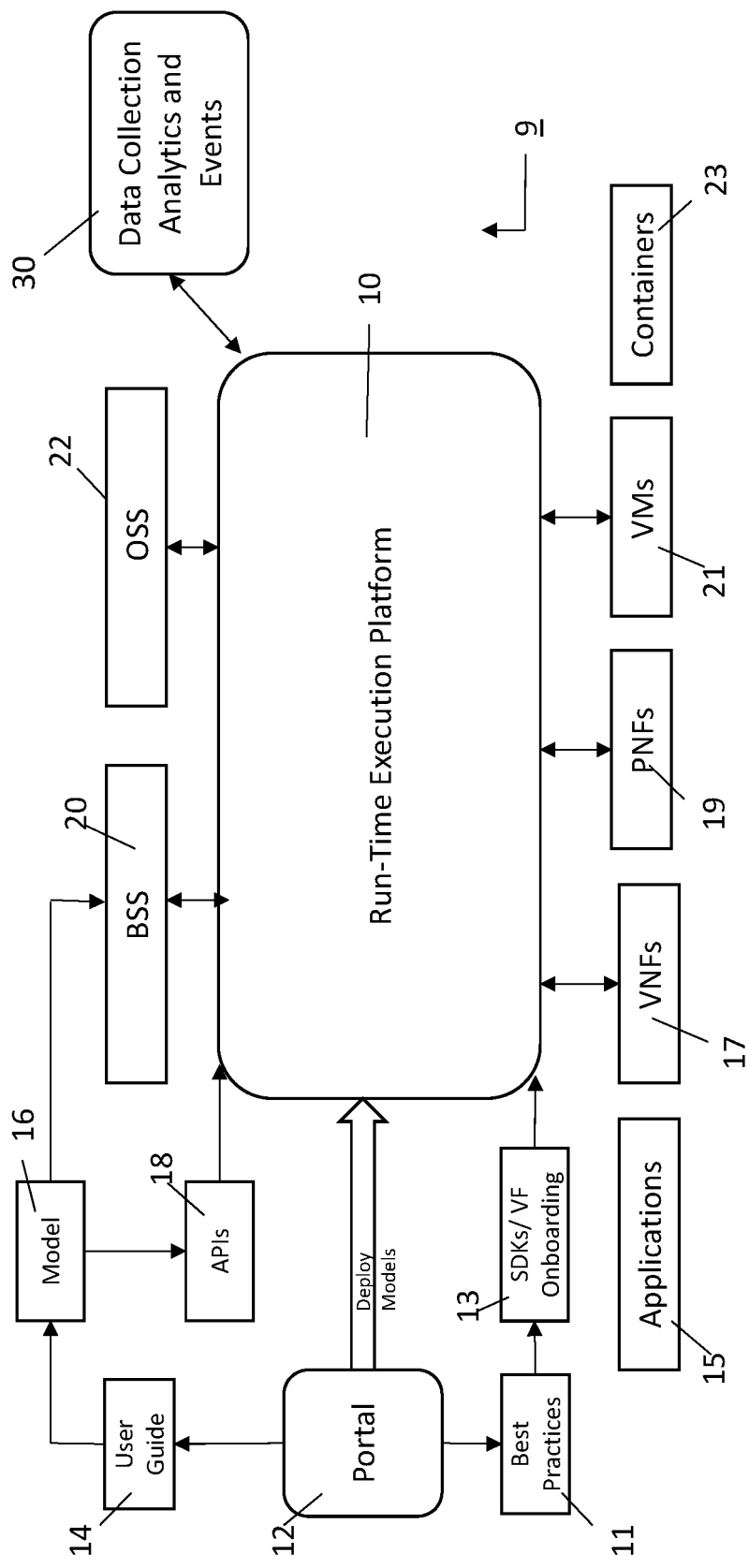
FIG. 2 is a representation of an exemplary platform architecture which may implement the functionality of FIG. 1.

With reference to FIG. 2, there is shown an exemplary architecture in which system 9 may operate. The system 9 may be configured to support the provision, operation and maintenance of a wireless communication network which may, for example, be 3G, 4G/LTE, 5G, or any other wireless communication system now known or to be developed. The wireless communication network may be configured in part or in whole using software defined network components. The system 9 may include a run-time execution platform 10 which may, for example, be an ECOMP platform or other platform to support edge computing. The run-time execution platform 10 may also be referred to simply as platform 10 herein. The platform 10 may be a single entity that provides management functions in a uniform manner to onboard, deliver and manage the lifecycle of SDN resources and services. The applications that use the platform 10 may interact with it via application program interfaces (APIs) 18 so applications need not have to know all inner components that comprise platform 10 and system 9.

The platform 10 may be accessible by a portal 12 which may, for example, be a server or other device that is operable to access and control the platform 10 and through which user or service provider generated models may be deployed on platform 10. A user guide 14 may assist a user in creating models 16 for an application. The models 16, together with APIs 18, may then determine the resources desired for the business support systems (BSS) 2 which in turn, may access the platform 10 for placing orders, monitor usage and perform other accounting functions. The models 16 and APIs 18 may also be used to determine and request features, functionality and capacity of the operational support systems (OSS) 22, which may, for example, include capacity, fallout, and key performance indicators (KPIs) and the like.

The portal 12 may also provide access to best practices 11 for SDN networks with respect to on-boarding and configuring new applications 15. Through the portal 12, users may access software development kits (SDKs) and virtual function on-boarding functions 13 to support models 16. From there, the platform 10 may control the instantiation of virtual network functions (VNFs) 17, physical network functions (PNFs) 18 and virtual machines (VMs) 21.

There is also shown a data collection analytics and events engine 30 that is in communication with platform 10. The data collection analytics and events engine 30, described in more detail below, may collect data and events necessary to manage and evolve networks and services.

Figure 3:
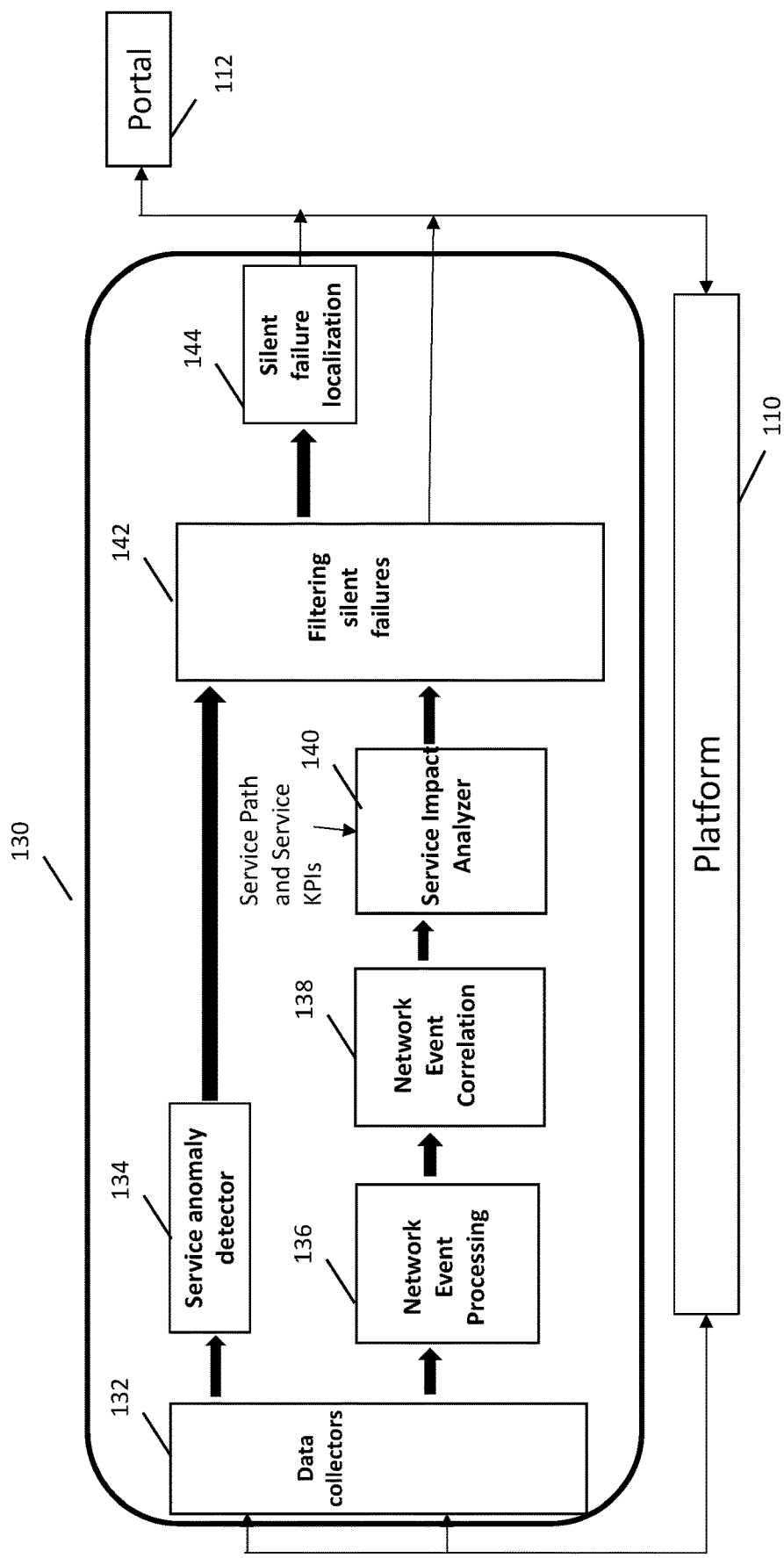
FIG. 3 is a representation of an exemplary architecture of the data collection and analytics events engine shown in FIG. 2.

With reference to FIG. 3, there is shown platform 110 which may, for example, be similar to platform 10 described above. In an aspect, platform 110 may be controlled and/or accessed by an integrated control loop 130. The integrated control loop 130 may be a DCAE module and include a data collection module 132 from platform 110. Outputs from platform 110 to DCAE engine 130 may include service metrics and network events and metrics. Service metrics may include, for example, metrics relating to service quality management (SQM) metrics, those metrics that affect the customer experience. As such, the data being collected may include both service metrics and network events and metrics. The data may include alarms, KPIs, service level quality measurements, and the like.

In an aspect, the data collector 132 may parse the collected data into two or more components. At a high level, one set of data may be be related to end-to-end customer service measurement events and performance issues as they may relate to KPIs, shown as the top path in FIG. 3. The other set of data, shown as the lower path in FIG. 3, may be related to network performance in view of faults, alarms, Syslogs, change activities, and other network events, along with performance-impacting events such as latency between servers or data losses. As will be described below, the lower path of the data flow may detect and correlate network events and then quantify the customer service impact of the correlated network events.

Following the top path, there is shown a service anomaly detection function 134 which analyzes the service quality measurements captured by the data collector module 132. The service anomaly detection function may, for example, be performed with assistance by a system provided by *Argus* Controls. This function may compare quality of service measurements to key performance indicators such as response time, quality of service measurements, resolution of audio and video streams, download and upload speeds, and other data that may impact the customer experience. The detected anomalies are then passed to the filtering silent failures function 142 discussed in more detail below and may also be fed into a service impact.

The data acquisition analytics and event engine 130 may include an event processing function 136. The event processing function may filter the collected event data to detect the anomalies generated by the network. The detected network anomalies may then be passed to the network event correlation function 138 which correlates the detected anomalies based on type of anomaly which may, for example be event-based anomalies such as a detected network event creates two or more alarms which may be caused by the same fault. Such faults may be correlated with other network event indicators such as Syslogs, planned maintenance outages and performance-based network events such as packet loss rates, latency, speed degradation and the like. The network-based and performance-based events may also be correlated based on geography, network element types, time of day, loading, or any other factor.

The output of the event correlation function 138 may be fed into a service impact analyzer 140. The service impact analyzer 140 may also receive service inputs from the platform directly in the form of service paths and service KPIs. The service impact analyzer 140 may quantify the impact that various network events may have on the customer experience. The service impact analyzer 140 may include programs that track planned network outages for maintenance and upgrades, a cell tower outage network analyzer, and inputs from other network systems. In an aspect, the service impact analyzer 140 may correlate network-based events with service quality issues that are highlighted by the service KPIs or other issues affecting the service path. For example, the service impact analyzer 140 may correlate a network event whereby an individual cell tower goes off-line to create an outage and generate an alarm condition with service quality issues being generated by neighboring cell towers whose KIPs indicate excessive loading, higher blocked or dropped call rates or other issues that affect service quality. Thus, a single fault in the network which would otherwise generate multiple trouble tickets for a plurality of cell sites can now be detected addressed with a single trouble ticket with the resolution prioritized based on the severity of the customer impact.

There is also shown a filtering silent failures function 142 which may be a spatial-temporal event correlation engine to produce two data flows, namely a flow of network-based events annotated with their respective service level impacts and a flow of silent service events which are defined as service issues with no known associated network root cause. The filtering silent failures function 142 thus generates two outputs, one output being those events whose root causes can be explained and another output being those events whose root causes cannot be explained.

With respect to those events whose root causes can be explained, the cause of the anomaly and the priority of resolution may be sent to a portal 112 where an operator may generate a trouble ticket. Alternatively, or additionally, this data fed back into platform 110 through the integrated control loop whereby the event that triggered the anomaly may be resolved automatically. In either case, the root cause of the problem may now be investigated by one maintenance team instead of two or three maintenance teams.

Continuing with the description of FIG. 3, the silent service events are then fed into a silent failure localization processor 144 which may narrow the potential causes of the service anomalies. The silent failure localization function 144 may be used when a cause of the service anomaly cannot be determined. The silent failure localization processor 144 may correlate similar issues and summarize the commonalities among the problem set. For example, there may be commonality with respect to gaming which may be localized to a particular video game such as Madden NFL 18. There may be a commonality with respect to geography, such as Atlanta, Ga. or South Bend, Ind. There may be commonality with respect to certain types of customer equipment such as a Samsung Galaxy® handset or an Apple iPhone®. The silent failure localization processor 144 may attempt to classify and correlate as many common characteristics as possible to assist with the further analysis and resolution of the anomalies. This correlated silent failure data may then be provided through portal 112 to a system operator for further investigation as well as being fed back as a control loop to platform 110.

Those outputs may be input to data collectors 132 in the DCAE engine 132. Data collectors 132 may perform initial analysis and segregation with respect to the types of data. Data associated with SQM may be passed to a service anomaly detection function 134 which may, for example, be performed by software programs created by *Argus* Control Systems Ltd.

Methods of Use.

Figure 4:
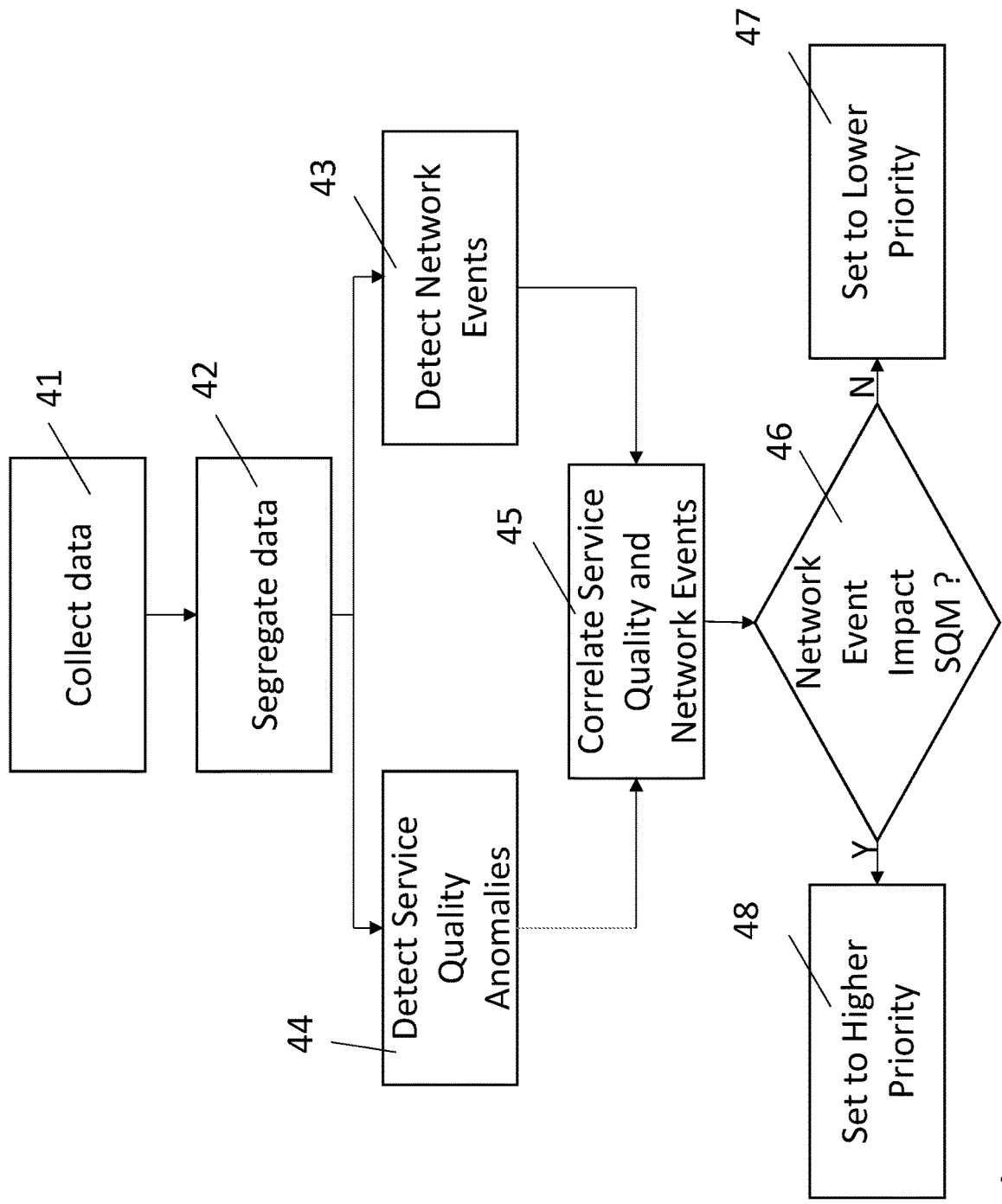
FIG. 4 is an exemplary flowchart showing an aspect of the operations of a method in accordance with the present disclosure.

With reference to FIG. 4, there is shown a flow chart beginning with a data collection function at 41. At 42, data is segregated as previously described with respect to service quality and network events. At 43, network events such as alarms, outages, and the like are detected while at 44, service quality anomalies such as customer-impacting performance issues are detected. At 45, the network events and customer-impacting service quality issues may be correlated, and the network events are annotated with the service quality issues. At 46, the network-based events are analyzed to determine whether those network-based events are impacting customer service quality measurements. If not, then resolution of those network-based events is set to a lower priority at 47. If the network-based events do impact customer service quality measurements, then the resolution of those network-based issues is set to a higher priority.

Figure 5:
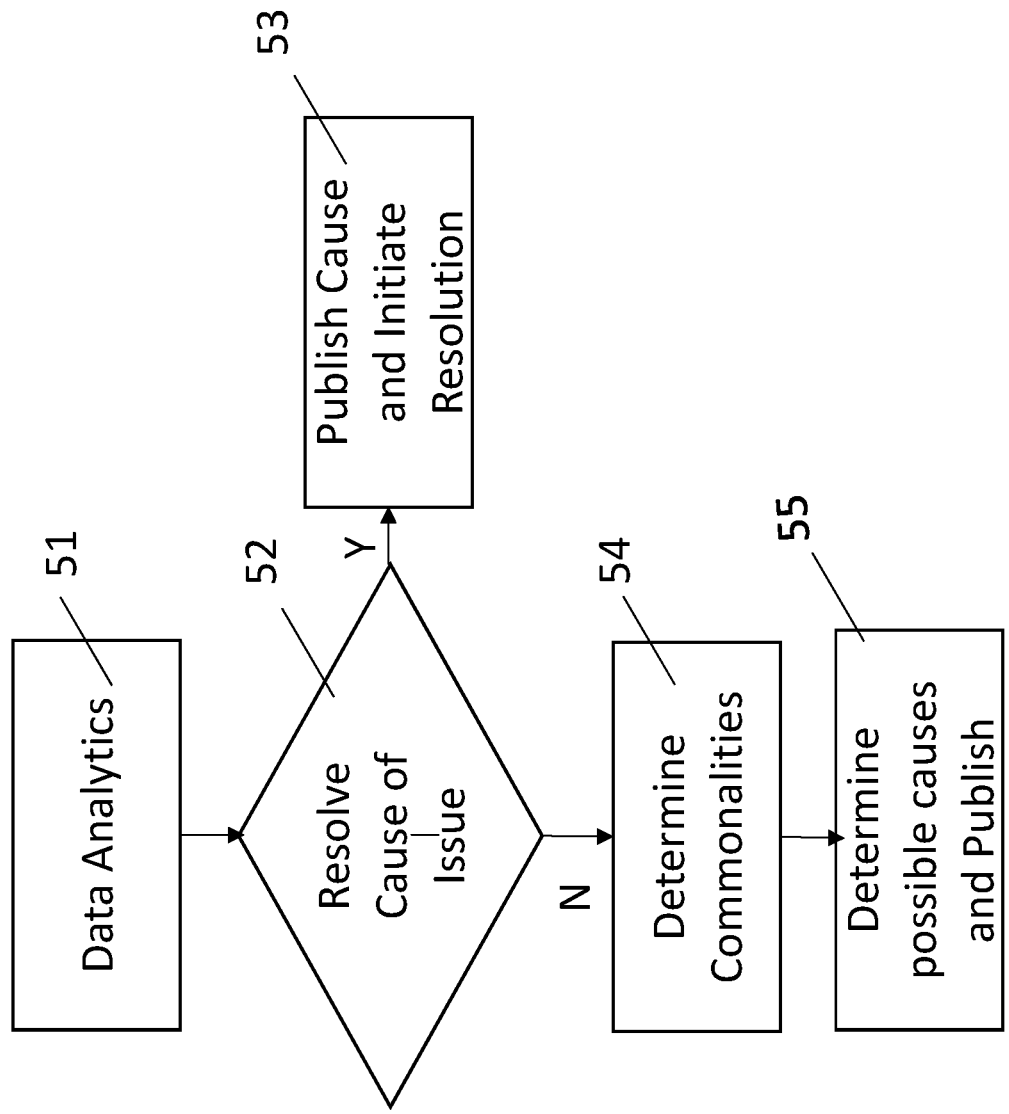
FIG. 5 is an exemplary flowchart showing another aspect of the operations of a method in accordance with the present disclosure.

As set forth above, there are times when the root cause of an anomaly cannot be determined with certainty. The flow chart in FIG. 5 shows the data flow starting with the data analytics function 51 as previously described. At 52, the analytics function results are filtered based on whether the root cause of the anomaly has been resolved. If yes, the cause of the anomaly may be published through the portal and resolution processes initiated, either by issuing trouble tickets or through automatic error correction methodologies. If the root cause of the anomaly is not determined at 52, i.e., the fault is a silent fault, then common symptoms of the fault are determined at 54 and based on those commonalities, a narrower range of possible root causes is determined at 55 and published to the portal for further analysis and trouble shooting. In both cases, the feedback loop to the platform is completed at 56.

The present disclosure has been described with respect to an integrated control loop 130 applied to a platform 110 whereby integrated control loop may be agnostic with respect to the services offered. The systems and methods of the present invention may work for any platform whereby certain events may or may not lead to service quality issues affecting customers or other operations. Other applications may include, but are not limited, to autonomous vehicles, transportation, factory management systems, home automations, virtual reality, augmented reality, and computer gaming, just to name a few.

The present disclosure provides an integrated control loop which is able to operate independently of any particular service and thus is available across multiple service offerings, including but not limited to mobility telecommunications functionality, Voice over LTE (VoLTE) and video services. Enabling an integrated control loop on a platform as described is able to reduce alarm fatigue and improve operational efficiency by eliminating duplication of effort in troubleshooting common issues among network and service operations teams, quantify the impact of network events to prioritize resolution activities. The integrated control loop is able to scale the analytics across both physical and network functions and services. Moreover, the architecture allows operators and service designers, including customers and contractors, to create control loop policies to address the needs of new or modified services and establish KPIs more efficiently.

As described, the disclosure permits the use of a data collection analytics event engine to provide an integrated control loop for an operational platform. The systems and methods of the disclosure are directed to solving a practical problem by providing a real world and practical solution that removes or minimizes duplication of effort for network and service maintenance and upgrade applications while allowing customers and users to develop their own policies to control and gain additional insight into the fault detection and service degradation functionality. The system and methods help customer service personnel understand and explain degradation of service levels and by the isolating or narrowing the scope of the root causes of such degradation, better predict the time before service is restored to normal levels while prioritizing the resolution of those problems that affect the customer experience. The present disclosure allows explicit incorporation of changing policies and KPIs to vary the control of the integrated control loop process and thus provide valuable additional capabilities of monitoring and maintaining platforms 110 or other systems employing integrated control loops and associated algorithms.

While examples of systems and methods for creating and applying integrated control loops for an operational platform have been described in connection with various computing devices/processors, the underlying concepts may be applied to any computing device, processor, or system capable of facilitating or hosting an integrate control loop system, including cloud-based systems, proprietary systems or open source systems in which the framework of creating an integrated automatic control loop with data collections and analytics engine solutions may be implemented. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   collecting operational data from a system;
   segregating the data into a first component comprising one or more service quality anomalies and a second component comprising network-based events, wherein the network-based events are one of a network-based fault or a degradation of network performance;
   correlating the network-based events to determine a root cause of the network-based events;
   analyzing the root cause in view of the first component to determine whether the root cause has an impact on service quality;
   providing feedback to the system wherein the feedback includes identifying the root cause that has been determined to have an impact on service quality and a recommended resolution of the root cause that has been determined to have an impact on service quality;
   categorizing the first component as a silent fault if no root cause is determined, wherein the silent fault comprises multiple symptoms;
   determining a narrower range of possible root causes of the silent fault based on analyzed commonalities among the multiple symptoms and publishing the narrower range of possible root causes for further analysis; and
   resolving the root cause that has been determined to have an impact on service quality.

2. The method of claim 1 further comprising prioritizing a resolution of the root cause that have a greater impact on service quality.

3. The method of claim 1 wherein an analysis of the first component comprises comparing service quality measurements to key performance indicators to determine the one or more service quality anomalies.

4. The method of claim 1 wherein the analyzing step annotates the network-based events with the service quality anomalies.

5. The method of claim 1 further comprising determining that a silent fault has not occurred and if a silent fault has not occurred, then a root cause of the service quality anomaly is determined.

6. A system comprising:
   an integrated feedback control loop in communication with a network comprising:

a data collector configured to collect service metrics and network metrics from the network;

a service anomaly detector in communication with the data collector wherein the service anomaly detector determines service level impacts associated with anomalies in the network;

a network event processor in communication with the data collector;

a network event correlator configured to determine a root cause of network events;

a service impact analyzer configured to annotate the root cause of the network-based events with the service quality impacts; and a master service orchestrator in communication with the integrated feedback control loop, the master service orchestrator configured to receive the annotated network-based events with the service quality impacts and categorize the service anomaly as a silent fault if no root cause is determined, wherein the silent fault comprises multiple symptoms, determine a narrower range of possible root causes of the silent fault based on analyzed commonalities among the multiple symptoms, publish the narrower range of possible root causes for further analysis, and resolve the root cause in the network.

7. The system of claim 6 further comprising a filter in communication with the service anomaly detector and the service impact analyzer, wherein the filter is configured to separate silent faults from other faults.

8. The system of claim 7 wherein the system further comprises a silent failure localization processor configured to correlate the multiple symptoms to assist in further resolution of the service level impact.

9. The system of claim 6 wherein the network metrics comprise network fault data and network performance data.

10. An analyzer comprising:

a data collector configured to collect service metrics and network metrics of a network wherein the analyzer is in communication with the data collector, the analyzer having an input-output interface;

a processor coupled to the input-output interface wherein the processor is coupled to a memory, the memory having stored thereon executable instructions that when executed by the processor cause the processor to effectuate operations comprising:

segregating the data into a first component comprising the service metrics and a second component comprising the network metrics;

analyzing the first component to identify at least one service impact anomaly;

analyzing the second component to identify a root cause of network events;

correlating the first component and the second component to determine whether the second component is the root cause of the first component;

annotating the network events with the service impact anomaly based on the correlating step;

categorizing the first component as a silent fault if no root cause is determined, wherein the silent fault comprises multiple symptoms;

determining a narrower range of possible root causes of the silent fault based on analyzed commonalities among the multiple symptoms and publishing the narrower range of possible root causes for further analysis; and providing feedback to the network wherein the feedback includes the annotated network events and a proposed resolution to the annotated network events.

11. The analyzer of claim 10 wherein the operations further comprise resolving the root cause of the network events if the network events have an impact on service quality metrics.

12. The analyzer of claim 11 wherein the operations further comprise prioritizing a resolution of the network events having a greater impact on the service quality metrics.

13. The analyzer of claim 10 wherein the network events are one of a network-based fault or a degradation of network performance.

14. The analyzer of claim 10 wherein the operations further comprise determining that a silent fault has occurred.

15. The analyzer of claim 14 wherein the operations further comprise analyzing the multiple symptoms to localize the silent fault based on the multiple symptoms.

16. The analyzer of claim 14 wherein the operations further comprise determining that a silent fault has not occurred and if a silent fault has not occurred, then a root cause of the service impact anomaly is determined.

* * * * *